(12) United States Patent
Tsukamoto et al.

(10) Patent No.: US 6,402,536 B2
(45) Date of Patent: Jun. 11, 2002

(54) BRANCHING CONNECTOR FIXING STRUCTURE

(75) Inventors: Masashi Tsukamoto; Masataka Nishijima; Mitsunobu Katoh, all of Shizuoka (JP)

(73) Assignee: Yazaki Corporation, Tokyo (JP)

(*) Notice: Subject to any disclaimer, the term of this patent is extended or adjusted under 35 U.S.C. 154(b) by 6 days.

(21) Appl. No.: 09/729,858

(22) Filed: Dec. 6, 2000

(30) Foreign Application Priority Data

Dec. 6, 1999 (JP) ............................. 11-346792

(51) Int. Cl.[7] .................................. H01R 4/60
(52) U.S. Cl. ....................................... 439/211
(58) Field of Search ........................ 439/207, 209, 439/211, 214, 404; 174/72 A

(56) References Cited

U.S. PATENT DOCUMENTS

| | | | | |
|---|---|---|---|---|
| 4,429,934 A | * | 2/1984 | VandenHoek et al. | 439/207 |
| 4,674,819 A | * | 6/1987 | Fujitani et al. | 439/404 |
| 4,815,984 A | * | 3/1989 | Sugiyama et al. | 439/211 |
| 5,203,711 A | * | 4/1993 | Bogiel | 439/215 |
| 5,460,530 A | * | 10/1995 | Toba et al. | 439/34 |
| 6,168,122 B1 | * | 1/2001 | Lobsiger et al. | 248/68.1 |
| 6,229,091 B1 | * | 5/2001 | Ogawa et al. | 174/72 A |
| 6,245,998 B1 | * | 6/2001 | Curry et al. | 174/72 A |
| 6,327,139 B1 | * | 12/2001 | Champion et al. | 361/608 |

FOREIGN PATENT DOCUMENTS

JP          9-66778       3/1997    ......... B60R/16/02

* cited by examiner

Primary Examiner—Brian Sircus
Assistant Examiner—Thanh-Tam Le
(74) Attorney, Agent, or Firm—Sughrue Mion, PLLC

(57) ABSTRACT

The branching connector fixing structure (20) has a pair of band-shaped frames (12) that are disposed apart in the direction of thickness, a plurality of flat circuit bodies (22) that are disposed respectively in layers between the band-shaped frames (12), and the branching connectors (24) that are respectively disposed on the flat circuit bodies (22), for the purpose of disposing of the branching connectors (24) along the same surfaces that are parallel to the respective band-shaped frames (12), wherein the branching connectors (24) is supported via a pair of fixing members (40), (50), bridging between the band-shaped frames (12) and fastenable in the predetermined position in the direction where each of the fixing members (40), (50) are disposed.

8 Claims, 7 Drawing Sheets

BRANCHING CONNECTOR FIXING STRUCTURE

BACKGROUND OF THE INVENTION

1. Field of the Invention

The present invention relates to branching connector fixing structures, for instance a branching connector fixing structure for wiring of a great number of wiring harnesses on such as a reinforcement frame.

2. Related Art

The electric instruments and devices, such as measuring instruments and an air conditioner, are installed on an instrument panel of an automobile and connected electrically with the wiring harnesses.

The JP-A-9-66778 "Automotive Wiring Harness" shows an example of the wiring harness that is housed and wired inside a hollow reinforcement that bridges between right and left side panels of an automotive body. The following paragraphs describe on the wiring harness on this gazette.

As shown in FIG. 11, a hollow reinforcement 81 is disposed inside an instrument panel 80, and a wiring harness is housed in a hollow part of the hollow reinforcement 81, wherein connectors 83 are attached to the branch lines that are branched from the wiring harness while the connectors 83 are respectively attached to apertures 82 in the hollow reinforcement 81. The connectors 83 are used to connect the branch lines to electric instruments and devices on the instrument panel 80.

Since the wiring harness is housed in the hollow part of the hollow reinforcement 81, any space for wiring of the wiring harness need not be secured outside of the hollow reinforcement 81. Therefore, the external space of the hollow reinforcement 81, which need not be reserved for wiring of the wiring harness, can be effectively used otherwise.

It is a usual practice that a single kind of hollow reinforcement 81 is applied to various kinds of vehicles instead of preparing various kinds of hollow reinforcements 81 that respectively match the various kinds of vehicles; otherwise increase in the parts count will cause laborious parts control.

The application of the single kind of hollow reinforcement 81 to various kinds of vehicles requires the apertures 82 in the hollow reinforcement 81 for attachment of the connectors 83 to be formed on a straight line to enable application to respective electric instruments and devices of various kinds of vehicles.

However, the formation of apertures 82 of the hollow reinforcement 81 on the single straight, a route of each wiring harness in the hollow reinforcement 81 is determined by the connectors 83 attached to the apertures 82 of the hollow reinforcement 81.

This makes it difficult to divide the bundled wiring harness into sub-harnesses according to the modules for neat arrangement of the wiring harness. Consequently, bundling of the complicated wiring harness increases a diameter of the bundled wiring harness and arouses problems of degradation in maintenance efficiency of respective sub-harnesses and tangling of wiring harness components in the bundled wiring harness.

SUMMARY OF THE INVENTION

In view of the problems described above, this invention is purposed to provide a branching connector fixing structure that enables compact bundling of the wiring harness, enhancement of respective sub-harness maintenance efficiency and prevention of entanglement of the wiring harness components in the bundled wiring harness.

The invention for achievement of the above-described purposes is a branching connector fixing structure, which has a pair of band-shaped frames that are disposed apart in a direction of thickness, a plurality of flat circuit bodies that are disposed respectively in layers between band-shaped frames, and branching connectors that are respectively disposed on flat circuit bodies, for the purpose of disposing of branching connectors along same surfaces that are parallel to respective band-shaped frames, and which is characterized by that each of the branching connectors is supported via a pair of fixing members bridging between band-shaped frames and fastenable in a predetermined position in a direction where each of fixing members are disposed.

The branching connector fixing structure with this composition enables division of the wiring harness into sub-harnesses according to the modules and bundling of flatly aligned sub-harnesses into flat circuit bodies. Additionally, the flat circuit bodies can be provided in layers between the band-shaped frames so that a pair of fixing members can support each of the branching connectors of the flat circuit bodies.

Since each sub-harness can be bundled with the flat circuit body, maintenance of the wiring harness is available or each sub-harness. In addition, bundling of the flatly aligned wiring harness into the flat circuit bodies can prevent entanglement of the wiring harness.

DESCRIPTION OF THE PREFERRED EMBODIMENTS

Figure 1:
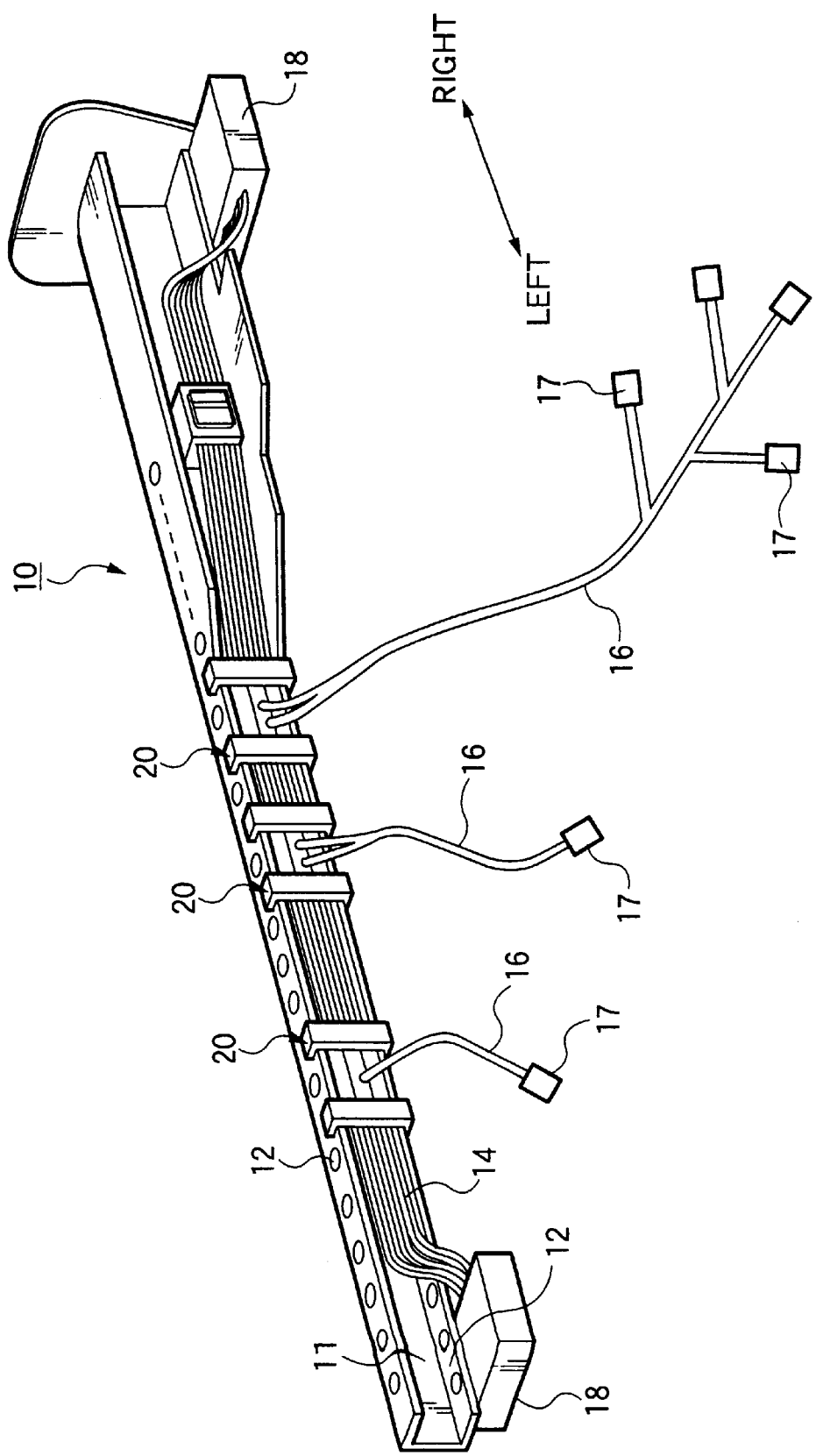
FIG. 1 is a perspective view of a reinforcement that comprises branching connector fixing structures of a first embodiment related to the invention.
Figure 2:
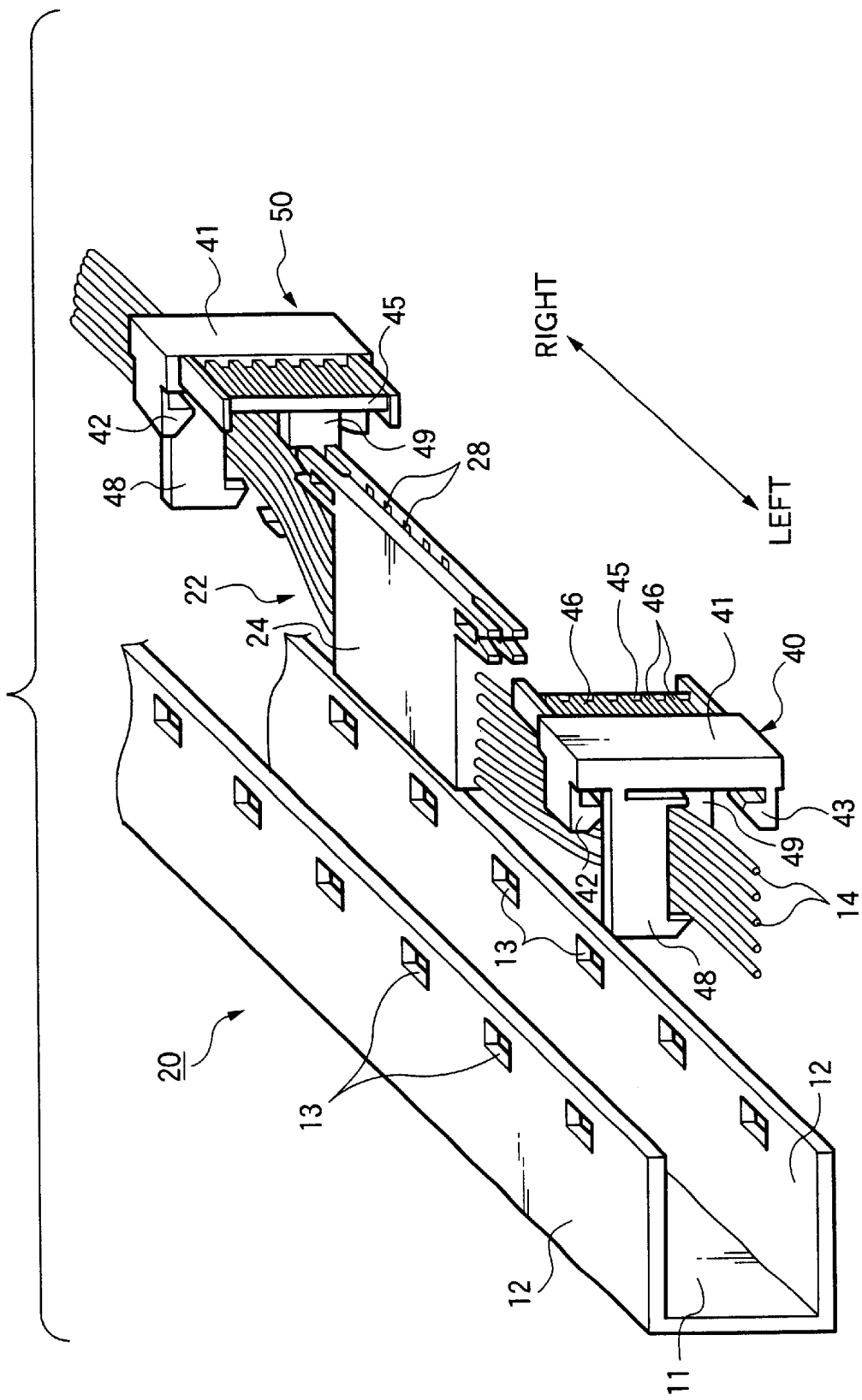
FIG. 2 is a perspective view of the branching connector fixing structure of the first embodiment related to the invention.
Figure 3:
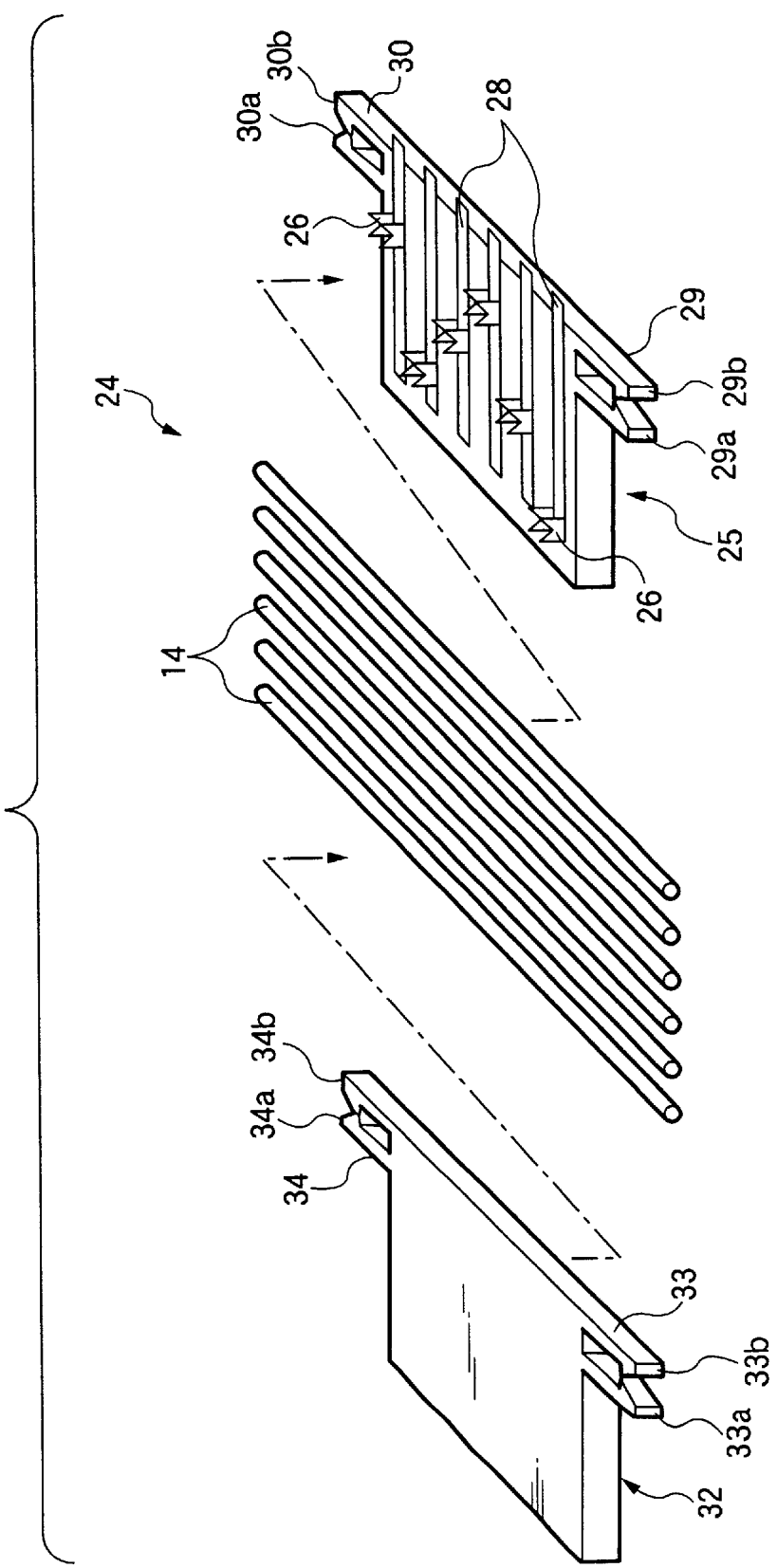
FIG. 3 is a perspective view of a wiring harness fixing structure on the branching connector of the first embodiment related to the invention.
Figure 4:
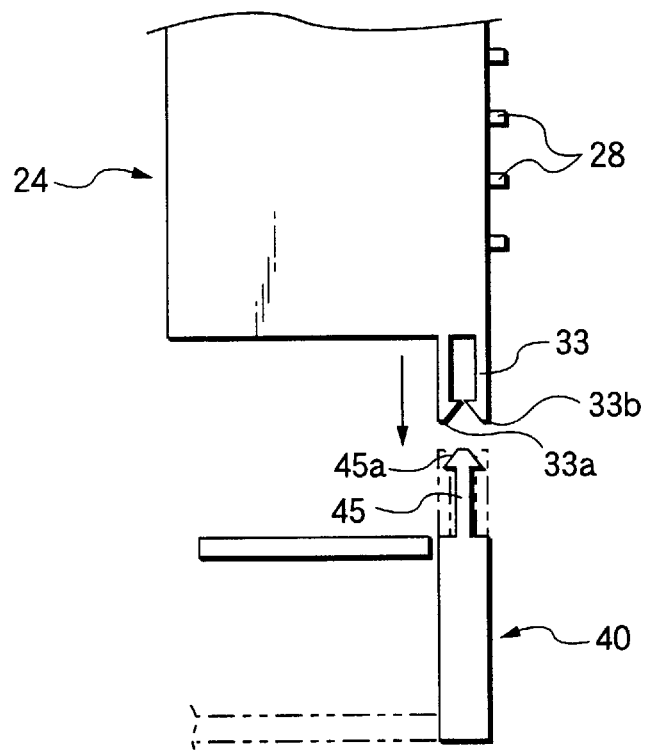
FIG. 4 is a plan to illustrate the installing operation of the branching connector fixing structure of the first embodiment related to the invention.
Figure 5:
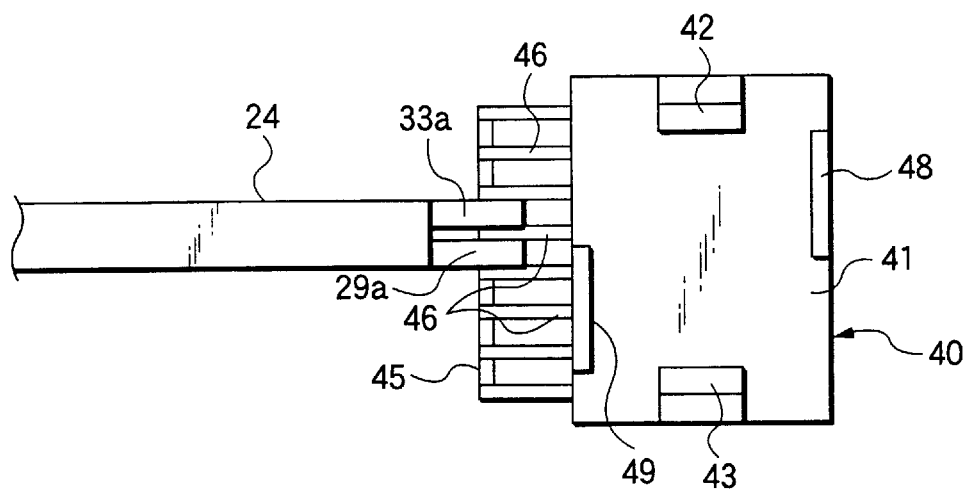
FIG. 5 illustrates a state where the branching connector fixing structure of the first embodiment related to the invention.
Figure 6:
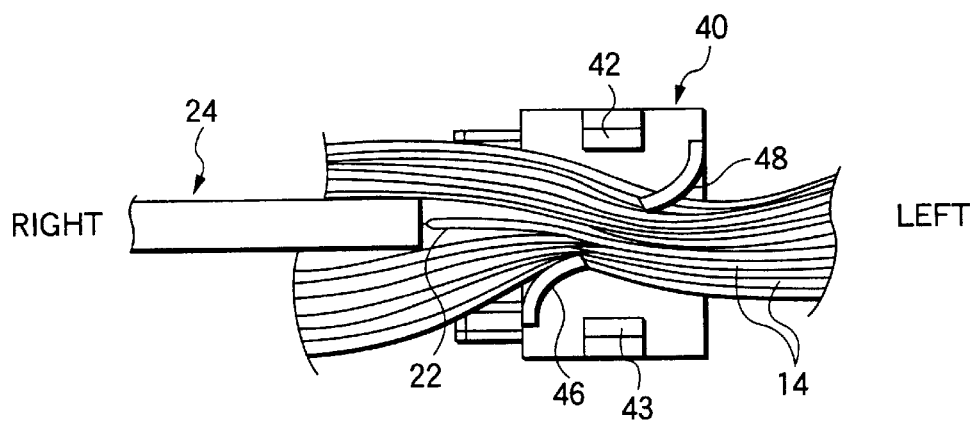
FIG. 6 illustrates a state where wiring harnesses are supported by the branching connector fixing structure (fixing component) of the first embodiment related to the invention.

Embodiments that relate to the invention are described in detail hereafter with references to the drawings. FIG. 1 is a perspective view of a reinforcement including branching connector fixing structures of a first embodiment related to the invention. FIG. 2 is a perspective view of the branching connector fixing structure of the first embodiment related to the invention. FIG. 3 is a perspective view of a wiring harness fixing structure on the branching connector of the first embodiment related to the invention. FIG. 4 is a plan to illustrate the installing operation of the branching connector fixing structure of the first embodiment related to the invention. FIG. 5 illustrates a state where the branching connector fixing structure of the first embodiment related to the invention. FIG. 6 illustrates a state where wiring harnesses are supported by the branching connector fixing structure (fixing component) of the first embodiment related to the invention.

A reinforcement 10 in FIG. 1, which is disposed inside an automotive instrument panel that is not shown in the figure, is a component for reinforcement of a vehicle body by being bridged between right and left side panels of the vehicle body.

The reinforcement 10 may be an open-square sectioned component composed of a pair of band-shaped frames 12 (hereinafter referred to as "flange") and a web 11, for instance. The flanges 12 are structural components of the branching connector fixing structure 20 related to the invention. Connectors 17 are connected to branch lines 16 that are branched from a plurality of wiring harnesses 14. Electric connection boxes 18 are connected to both ends of a plurality of wiring harnesses 14.

As shown in FIG. 2, the branching connector fixing structure 20 of the first embodiment includes: the pair of flanges 12 that are disposed apart in the direction of the thickness; layers of flat circuit bodies 22 that are disposed between the flanges 12; and branching connectors 24 that are provided on the flat circuit bodies 22. The branching connector fixing structure 20 is purposed for disposing the branching connectors 24 along the same surfaces that are parallel to the flanges 12. Each of the branching connectors 24 is supported by a pair of (right and left) fixing components 40 and 50 and capable of being fixed in a position in the construction direction of the fixing components 40 and 50.

Since the right and left fixing components 40 and 50 are symmetric parts, only the left fixing component 40 is described to omit the description on the right fixing component 50.

The wiring harnesses 14 are divided into sub-harnesses according to the modules, and the sub-harnesses are respectively aligned in a flat shape and bundled with branching connectors 24 into the flat circuit bodies 22.

As shown in FIG. 3, the branching connector 24 holds wiring harnesses 14 between a lower connector 25 and a higher connector 32, wherein the wiring harnesses 14 are connected to bus bars 28.

The lower connector 25 has a substantially-rectangular shape has the bus bars 28 on the upper surface thereof. The bus bars 28 has retainer parts 26 including insulation displacement blades (not shown in the figure). The bus bars 28 for contact with the insulation displacement blades are attached to the upper surface. Right and left clasp parts 29 and 30 are formed on the right and left lateral sides of the lower connector 25.

Accordingly, only fixing of the wiring harness 14 to the retainer parts 26 causes cutting of the insulative material in the wiring harness. The conductor of the wiring harnesses 14 are connected to the bus bars 28 through the insulation displacement blades.

The left clasp part 29 includes a pair of hooks 29a and 29b, and the right clasp part 30 includes a pair of hooks 30a and 30b.

The upper connector 32 is a component that is formed in approximately the same rectangular shape, and right and left clasp parts 33 and 34 are formed on the right and left lateral sides thereof.

The left clasp part 33 includes a pair of hooks 33a and 33b, and the right clasp part 34 includes a pair of hooks 34a and 34b.

As shown in FIG. 2, the left fixing component 40 has upper and lower hooks 42 and 43 formed at the top and bottom of a rectangular main body 41. An insertion part 45 is formed at the right end of the rectangular main body 41. Positioning portions 46 are formed at the insertion part 45 at predetermined intervals. Upper and lower flexible supporters 48 and 49 for the support of the wiring harnesses 14 of the flat circuit body 22 in a flat state are provided on the rear side of the rectangular main body 41.

As to the left fixing component 40, the left fixing component 40 can be attached to a predetermined position of the pairs of flanges 12 by locking the upper and lower hooks 42 and 43 in engagement holes 13 that are formed in the pair of flanges 12.

The right and left fixing components 40 and 50 can be attached in a desired position through formation of the engagement holes 13 in the pair of flanges 12 at equal intervals, for instance. Therefore, it is possible to meet variations in the attaching positions.

As shown in FIG. 4, The clasp part 33 (33a and 33b) of the branching connector 24 is fitted onto the insertion part 45 of the left fixing component 40 as shown with an arrow. The clasp part 33 (33a and 33b) of the branching connector 24 is locked by a wedge part 45a of the insertion part 45. And the branching connector 24 can be attached to the left fixing component 40.

In this state, as shown in FIG. 5, an arbitrary vertical positioning of the branching connector 24 is available through selective positioning of the upper and lower hooks 33a and 29a of the branching connector 24 between positioning portions 46 of the left fixing component 40.

For this reason, it is possible to use with same fixing component 40 even in a case wherein a vertical position of the branching connector 24 is different.

In addition, as shown in FIG. 6, it is possible to support the wiring harnesses 14 of the flat circuit body 22 in a flat state through supporting of the wiring harnesses 14 or the flat circuit body 22 with the flexible supporters 48 and 49 of the left fixing component 40.

This enables attachment of the branching connector 24 in the predetermined positions in the flanges 12 with the right and left fixing components 40 and 50 that are shown in FIG. 2.

As described above, the branching connector fixing structure 20 of the first embodiment enables bundling of the wiring harnesses 14 as flat circuit bodies 22 according to the modules and supporting of the branching connectors 24 of the flat circuit bodies 22 with the right and left fixing components 40 and 50. Therefore, the wiring harnesses 14 can be compactly bundled.

Moreover, the bundling of the wiring harnesses 14 into the flat circuit bodies 22 according to the sub-harnesses enables maintenance of the wiring harnesses 14 by each sub-harness.

In addition, the bundling of the wiring harnesses 14 that are aligned flatly into the flat circuit bodies 22 can prevent entanglement of the wiring harnesses 14.

Figure 7:
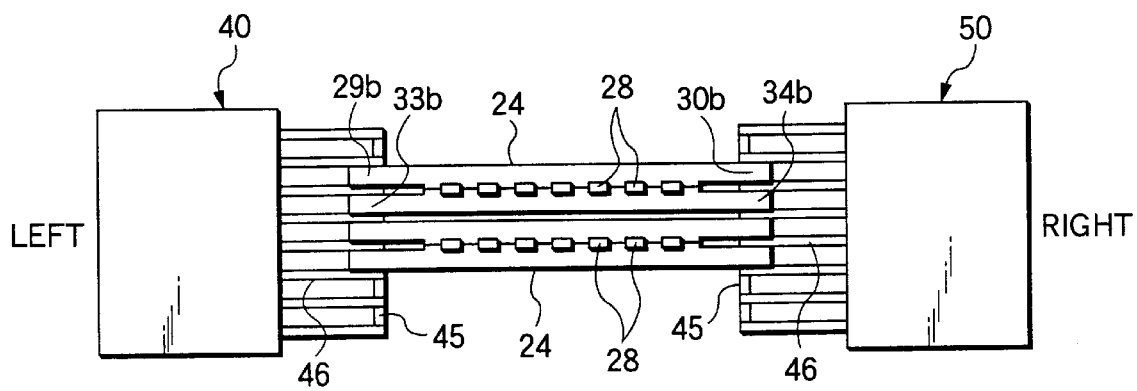
FIG. 7 is a lateral side view to illustrate modification of the branching connector fixing structure the first embodiment related to the invention.

Although the embodiment where one branching connector 24 is attached to the right and left fixing components 40 and 50 has been explained with references to FIGS. 2 through 6, it is also possible to attach a plurality of branching connectors 24 (2 connectors, for instance) to the right and left fixing components 40 and 50 in layers as shown in FIG. 7.

Since the plural branching connectors 24 can be attached, the number of branching connectors 24 can be selected as in need, and this facilitates the operational efficiency.

Now, second and third embodiments are described. Identical reference numerals are given to the same components in the second and the third embodiments and the explanation is omitted.

Figure 8:
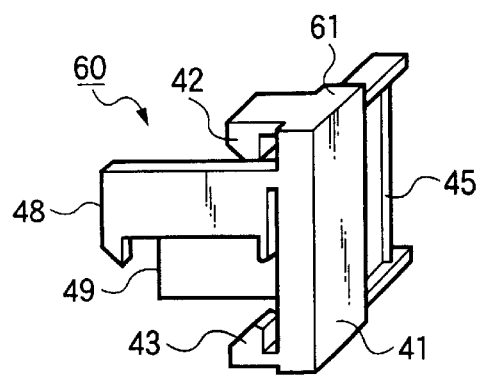
FIG. 8 is a perspective view of the branching connector fixing structure (fixing component) of the second embodiment related to the invention.

As shown in FIG. 8, a branching connector fixing structure 60 of the second embodiment differs from the first embodiment in the point that a left fixing component 61 is not provided with positioning portions and the other compositions are the same as those of the first embodiment.

For this reason, the branching connector fixing structure 60 of the second embodiment enables stepless free vertical movements when the branching connector 24 is attached to the left fixing component 61, without stepped control of the vertical position of the branching connector 24 as in the first embodiment.

Figure 9:
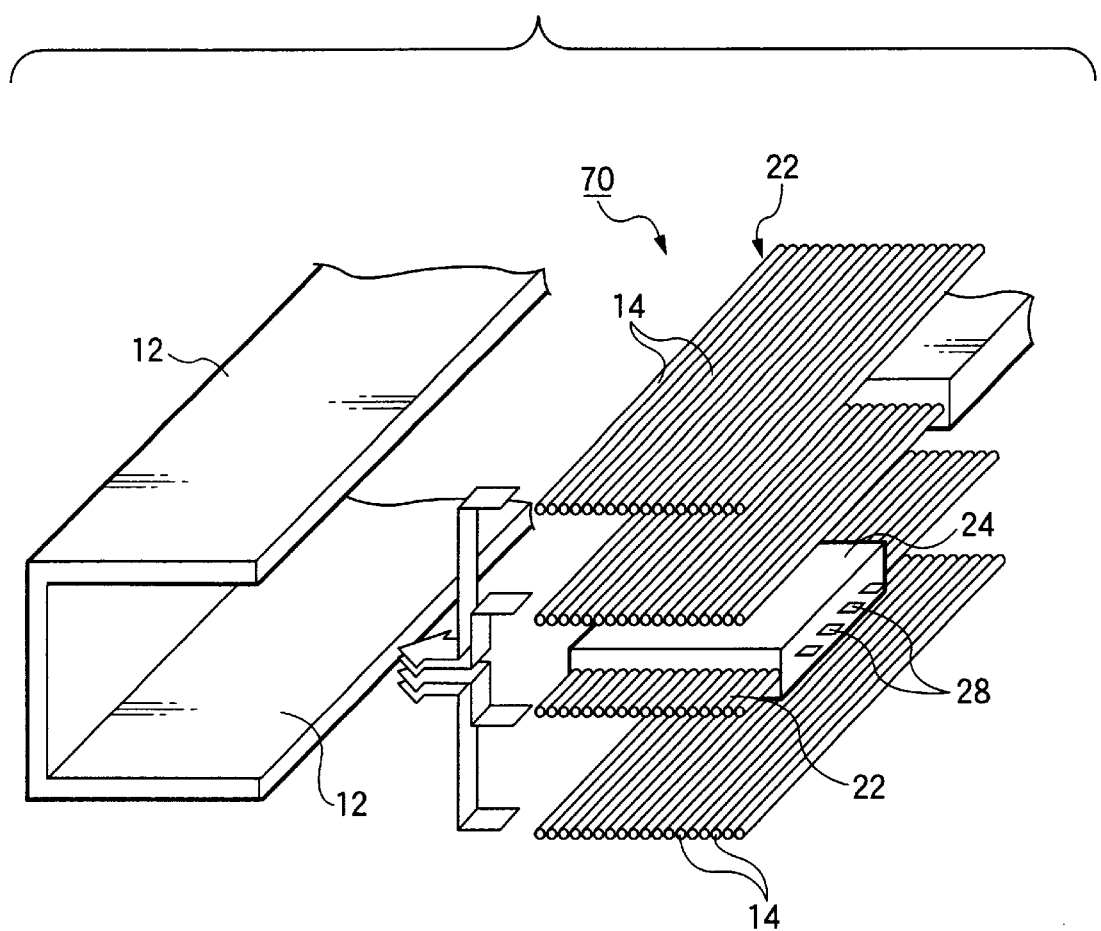
FIG. 9 is a perspective view of the branching connector fixing structure of the third embodiment related to the invention.

As shown in FIG. 9, a branching connector fixing structure 70 of the third embodiment differs from the first embodiment in the point that the branching connector 24 is not supported by the right and left fixing components and the other compositions are he same as those of the first embodiment.

Figure 10:
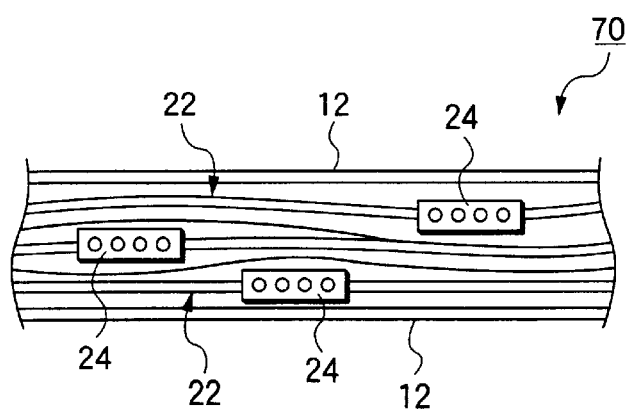
FIG. 10 is a plan of the branching connector fixing structure of the third embodiment related to the invention.
Figure 11:
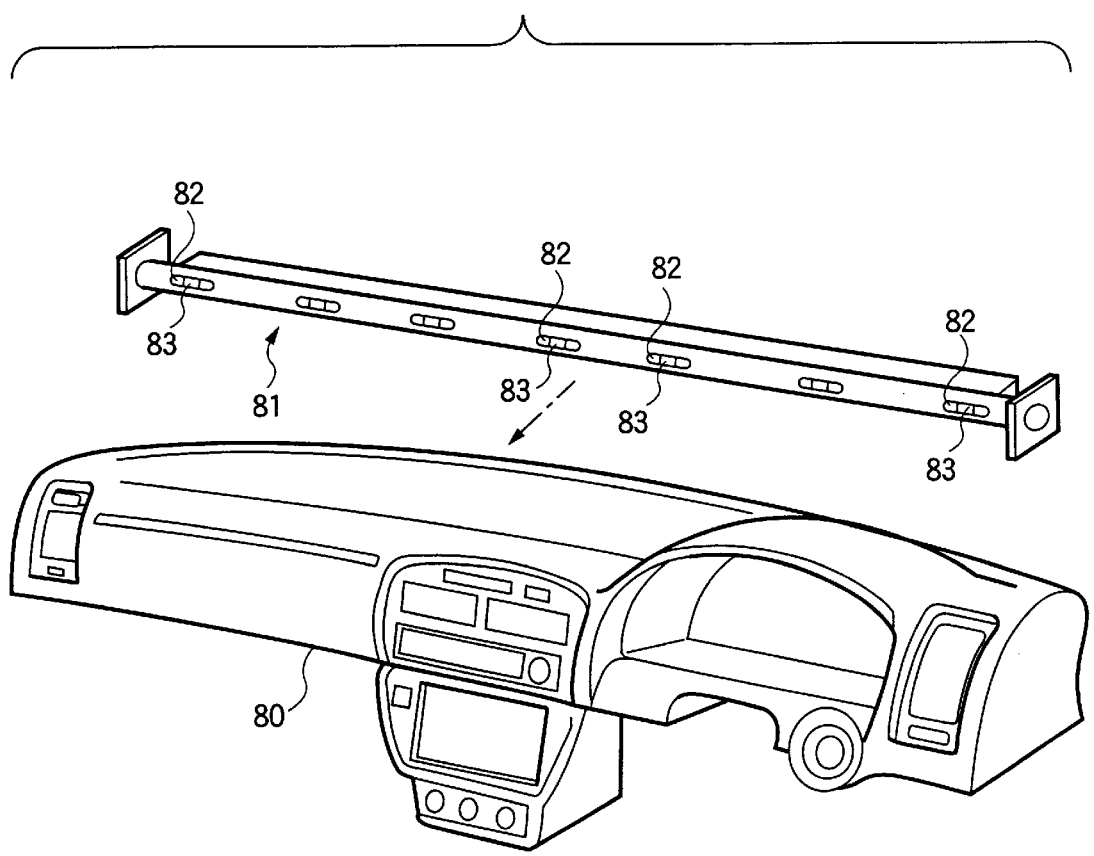
FIG. 11 is a perspective view of a reinforcement that comprises a conventional branching connector fixing structure.

That is, the branching connector fixing structure 70 of the third embodiment includes: a pair of flanges 12 that are disposed apart in the direction of the thickness; layers of flat circuit bodies 22 that are disposed between the flanges 12; and branching connectors 24 that are provided on the flat circuit bodies 22. The branching connector fixing structure 70 is composed so that the branching connectors 24 are disposed along the same surfaces that are parallel to the flanges 12 (refer to FIG. 10).

The branching connector fixing structure 70 of the third embodiment, wherein the wiring harnesses 14 are bundled into flat circuit bodies 22 according to the modules so that plural flat circuit bodies 22 are disposed in layers between the flanges 12, enables compact bundling of the wiring harnesses 14.

Moreover, since the wiring harnesses 14 are bundled into flat circuit bodies 22 according to sub-harnesses, maintenance of the wiring harnesses 14 by each sub-harness is available. In addition, the bundling of flatly aligned wiring harnesses 14 into the flat circuit bodies 22 can prevent the entanglement of the wiring harnesses 14 can be prevented from twining.

The branching connector fixing structure of the invention is not limited to the above-described embodiments but capable of appropriate modifications and improvements. For instance, although the reinforcement 10 in the above-described embodiments has the open-square section but the reinforcement may has an H-shaped section instead of the open-square section.

Moreover, although the pair of band-shaped frames is the flanges 12 of the reinforcement 10, other components may take the place.

As described above, the branching connector fixing structure by the invention has the pair of band-shaped frames that are disposed apart in the direction of thickness, the plurality of flat circuit bodies that are disposed respectively in layers between the band-shaped frames, and the branching connectors that are respectively disposed on the flat circuit bodies, for the purpose of disposing of the branching connectors along the same surfaces that are parallel to the respective band-shaped frames, and which is characterized by that each of the branching connectors is supported via the pair of fixing members bridging between the band-shaped frames and fastenable in the predetermined position in the direction where each of the fixing members are disposed.

The branching connector fixing structure with this composition enables the division of the wiring harness into the sub-harnesses according to the modules and the bundling of the flatly aligned sub-harnesses into the flat circuit bodies. Additionally, the flat circuit bodies are disposed in layers between the band-shaped frames and the pair of fixing members support each of the branching connectors of the flat circuit bodies. Therefore, the wiring harnesses can be bundled compactly.

Since each sub-harness can be bundled with the flat circuit body, the maintenance of the wiring harness is available for each sub-harness. This can enhance the maintenance efficiency of the wiring harnesses. In addition, the bundling of the flatly aligned wiring harness into the flat circuit bodies can prevent the entanglement of the wiring harnesses.

What is claimed is:

1. A branching connector fixing structure having a pair of band-shaped frames disposed apart in a first direction, said branching connector fixing structure, comprising:

at least one flat circuit body disposed between said band-shaped frames;

at least one branching connector provided at said at least one flat circuit body;

a pair of fixing members which supports said at least one branching connector, each of said fixing members bridged between said band-shaped frames;

wherein said at least one branching connector is fixable to a predetermined position of said fixing member in said first direction.

2. A branching connector fixing structure according to claim 1, wherein said fixing member is fixable to a predetermined position of said band-shaped frames in a direction substantially perpendicular to said first direction.

3. A branching connector fixing structure according to claim 2, wherein a plurality of a pair of engagement holes are respectively formed at said pair of band-shaped frames at predetermined intervals, a pair of hooks engaged with said pair of engagement holes are provided formed at said fixing member.

4. A branching connector fixing structure according to claim 1, wherein at least one clasp part formed at said branching connector is attached to an insertion part formed at said fixing member.

5. A branching connector fixing structure according to claim 4, wherein said at least one clasp part is slidable along said insertion part in said first direction.

6. A branching connector fixing structure according to claim 4, wherein said at least one clasp part is positioned between positioning portions formed at the insertion part at predetermined intervals.

7. A branching connector fixing structure according to claim 1, wherein a plurality of said flat circuit bodies are superposed each other.

8. A branching connector fixing structure according to claim 1, wherein said branching connector is disposed parallel to said band-shaped frames.

* * * * *